United States Patent
Tadokoro et al.

(10) Patent No.: US 6,838,161 B2
(45) Date of Patent: Jan. 4, 2005

(54) NON-ASBESTOS FRICTION MATERIAL

(75) Inventors: Fumihiko Tadokoro, Gunma-ken (JP); Takayuki Ohe, Gunma-ken (JP); Takeo Nagata, Gunma-ken (JP); Jun Nagashima, Gunma-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/186,721

(22) Filed: Jul. 2, 2002

(65) Prior Publication Data

US 2003/0049427 A1 Mar. 13, 2003

(30) Foreign Application Priority Data

Jul. 2, 2001 (JP) ........................................ 2001-200737
Sep. 18, 2001 (JP) ........................................ 2001-282928

(51) Int. Cl.⁷ ........................... B32B 27/04; B32B 27/12
(52) U.S. Cl. ................................ 428/292.1; 428/293.1; 428/297.4
(58) Field of Search .............................. 428/292.1, 323, 428/328, 293.1, 297.1; 423/328; 523/155, 156

(56) References Cited

U.S. PATENT DOCUMENTS

| 4,369,263 | A | * | 1/1983 | Matsushima et al. | ........ 523/152 |
| 4,743,634 | A | * | 5/1988 | Royer | ........................ 523/150 |
| 5,962,551 | A | * | 10/1999 | Kobayashi et al. | .......... 523/153 |
| 5,977,004 | A | * | 11/1999 | Higashi et al. | .............. 501/135 |
| 6,284,815 | B1 | * | 9/2001 | Sasahara et al. | ............. 523/149 |
| 6,413,622 | B1 | * | 7/2002 | Kobayashi | ................ 428/293.1 |
| 6,451,872 | B1 | * | 9/2002 | Yamane | ........................ 523/156 |
| 6,475,614 | B2 | * | 11/2002 | Hikichi | ......................... 428/332 |
| 6,596,789 | B2 | * | 7/2003 | Nakamura et al. | ........... 523/155 |
| 2001/0005547 | A1 | | 6/2001 | Hikichi | ..................... 428/293.1 |

FOREIGN PATENT DOCUMENTS

| EP | 1 070 751 A | | 1/2001 |
| EP | 1 170 257 A | | 1/2002 |
| JP | 2001-172613 | * | 6/2001 |

* cited by examiner

Primary Examiner—B. Hamilton Hess
Assistant Examiner—Camie S Thompson
(74) Attorney, Agent, or Firm—Birch, Stewart, Kolasch & Birch, LLP

(57) ABSTRACT

A non-asbestos friction material is obtained by molding and curing a composition which includes a fibrous base other than asbestos, a binder and a filler wherein the fibrous base contains no inorganic fibers having a length of at least 5 $\mu$m, a diameter of up to 3 $\mu$m and an aspect ratio greater than 3, and the binder includes a resin having a flow of at most 27 mm at 125° C. The friction materials having a porosity of 8 to 20% exhibit a good braking performance and stability, are endowed with good resistance to fade and wear, provide enhanced safety and hygiene during production, and have minimal impact on the human body from dust generated during use.

5 Claims, No Drawings

NON-ASBESTOS FRICTION MATERIAL

BACKGROUND OF THE INVENTION

1. Field of the Invention

The present invention relates to non-asbestos friction materials which are well suited for use as brake pads, brake linings and clutch facings in automobiles and various kinds of industrial machinery.

2. Prior Art

A variety of inorganic fibers are used in automotive friction materials, and especially disk pads, to provide outstanding friction performance and noise characteristics. In particular, common use has been made of various types of whiskers, which are hard fibers that are effective for braking, and rock wool, which provides good strength. However, because inorganic fibers of this type which have a length of at least 5 μm, a diameter of up to 3 μm and an aspect ratio greater than 3 are known to be inhalable and potentially carcinogenic, efforts are being made to avoid their use. That is, the artificial inorganic fibers that have been used up until now are similar in shape to asbestos and are thought to be capable of triggering cancer in the same way as asbestos. Hence the interest in minimizing their use. Requirements for avoiding the use of similarly shaped fibers and materials which generate similarly shaped fibers as they break down are expected to become increasingly stringent.

Yet, fibers of this type have a low bulk density, which enhances the porosity of the friction material and in turn contributes to better fade performance and more effective braking action at high speeds. Failure to use such fibers lowers the porosity of the friction material and detracts from its fade performance and its effectiveness in high-speed braking.

SUMMARY OF THE INVENTION

It is therefore an object of the invention to provide non-asbestos friction materials which are free of inorganic fibers having a length of at least 5 μm, a diameter of up to 3 μm and an aspect ratio greater than 3 that are suspected of being carcinogenic, yet have an excellent friction performance, wear resistance and noise characteristics, a sufficient shear strength, are not readily subject to damage such as cracking at the sides of the friction material, and have an acceptable strength and appearance.

We have discovered that, in a non-asbestos friction material in which the fibrous base contains no inorganic fibers having a length of at least 5 μm, a diameter of up to 3 μm and an aspect ratio greater than 3 which are suspected of being carcinogenic, by using as the binder a resin having a flow of at most 27 mm at 125° C. and by giving the friction material a porosity of 8 to 20%, the friction material can be endowed with a good, stable braking performance, good resistance to fade and wear, greater safety and hygiene during production, and minimal impact on the human body from dust released during use.

Accordingly, the invention provides a non-asbestos friction material made by molding and curing a composition which includes a fibrous base other than asbestos, a binder and a filler, which friction material has a porosity of 8 to 20%. The fibrous base is free of inorganic fibers having a length of at least 5 μm, a diameter of up to 3 μm and an aspect ratio greater than 3. The binder includes a resin having a flow of at most 27 mm at 125° C.

DETAILED DESCRIPTION OF THE INVENTION

As noted above, the non-asbestos friction material of the invention is made by molding and curing a composition composed primarily of a fibrous base, a binder and a filler.

The fibrous base may be any non-asbestos inorganic fiber or organic fiber ordinarily used in friction materials. Illustrative examples of suitable fibrous bases include inorganic fibers such as metal fibers (e.g., iron, copper, brass, bronze and aluminum), ceramic fibers, potassium titanate fibers, glass fibers, rock wool, wollastonite, sepiolite, attapulgite and synthetic mineral fibers; and organic fibers such as carbon fibers, aramid fibers, aramid pulp, polyimide fibers, polyamide fibers, phenolic fibers, cellulose and acrylic fibers. These fibrous bases may be used alone or as combinations of two or more thereof, so long as they do not contain inorganic fibers having a length of at least 5 μm, a diameter of up to 3 μm, and an aspect ratio greater than 3.

The fibrous base may be used in the form of short fibers or a powder, and is included in an amount of preferably 10 to 50 vol %, and most preferably 15 to 40 vol %, based on the overall friction material composition.

The binder may be any known binder commonly used in friction materials. Illustrative examples include phenolic resins, various rubber-modified phenolic resins such as high-ortho phenolic resins modified with acrylonitrile-butadiene rubber (NBR), NBR-modified phenolic resins and acrylic rubber-modified phenolic resins, and also melamine resins, epoxy resins, NBR, nitrile rubber and acrylic rubber. Any one or combinations of two or more of these may be used.

In the invention, the binder includes a resin having a flow at 125° C. of at most 27 mm, preferably from 2 to 27 mm, and most preferably from 2 to 25 mm. The resin is included in an amount of preferably at least 15 vol %, more preferably 15 to 30 vol %, and most preferably 15 to 25 vol %, based on the overall friction material composition. A binder other than the above resin may also be included in the composition, although the overall amount of binder should be set at not more than 30 vol %.

The flow mentioned above is the value measured in accordance with JIS K6910-95.

The filler used in the friction material of the invention may be composed of organic fillers and inorganic fillers. Illustrative examples of suitable organic fillers include cashew dust, ground tire rubber, rubber dust (rubber powder and granules), nitrile rubber dust (vulcanized product) and acrylic rubber dust (vulcanized product). These may be used alone or as combinations of two or more thereof. The amount of such organic fillers is preferably 5 to 30 vol %, and most preferably 10 to 25 vol %, based on the overall friction material composition.

Suitable inorganic fillers include barium sulfate, calcium carbonate, mica, coke and graphite, as well as metal powders such as iron, copper and aluminum. Such inorganic fillers can generally be included in an amount of 30 to 75 vol %, and preferably 30 to 65 vol %, based on the overall friction material composition. In the present invention, the filler includes preferably 1 to 50 vol %, more preferably 5 to 50 vol %, and most preferably 10 to 30 vol %, based on the overall friction material composition, of inorganic particles having a Mohs hardness of 4 to 5 and a particle size of 1 to 500 μm, preferably 10 to 500 μm, and most preferably 30 to 100 μm.

Examples of suitable inorganic particles include flake (or scaly) and tabular titanates, such as tabular potassium hexatitanate, flake potassium octatitanate and flake magnesium potassium octatitanate. These titanates have an average particle size of preferably 1 to 30 μm when flake, and preferably 10 to 500 μm when tabular.

To enhance the strength of the friction material, it is advantageous for the flake or tabular titanate to be surface-treated with a coupling agent, and especially an aminosilane coupling agent. Surface treatment may be carried out by a suitable known method, although it is 1 wt %, and especially 0.3 to 0.7 wt %, based on the titanate.

The friction material of the invention is generally produced by uniformly blending the above-described components in a suitable mixer such as a Henschel mixer, Loedige mixer or Eirich mixer, and preforming the blend in a mold. The preform is then molded at a temperature of 130 to 200° C. and a pressure of 100 to 1,000 kg/cm² for a period of 2 to 15 minutes.

The resulting molded article is typically postcured by heat treatment at 140 to 250° C. for 2 to 48 hours, then spray-painted, baked and surface-ground as needed to give the finished article.

In the case of automotive disk pads, production may be carried out by placing the preform on an iron or aluminum plate that has been pre-washed, surface-treated and coated with an adhesive, molding the preform in this state within a mold, and subsequently heat-treating, spray-painting, baking and surface-grinding.

It is critical for the friction material to have a porosity of 8 to 20%, preferably 10 to 20%, and most preferably 13 to 20%. At less than 8%, the friction coefficient decreases and fade resistance worsens, whereas at more than 20%, the wear resistance and strength decline. The porosity is the value measured in accordance with JIS D4418.

It is desirable for the friction material of the invention to have a shear strength of at least 3.5 KN, preferably 3.8 to 6.0 KN, and most preferably 4.0 to 5.5 KN. The shear strength is the value measured by the shear test method described in JIS D4415 using a test piece having a size of 10×30×5 mm.

The non-asbestos friction material of the invention can be used in a broad range of applications, including brake linings, clutch facings, disk pads, paper clutch facings and brake shoes in automobiles, large trucks, railroad cars and various types of industrial machinery.

EXAMPLES

Examples and comparative examples are given below by way of illustration, and are not intended to limit the invention.

Examples 1 to 5, Comparative Examples 1 to 4

Friction material compositions formulated as shown in Table 1 were uniformly blended in a Loedige mixer and preformed in a pressure mold under a pressure of 100 kg/cm² for a period of 1 to 3 minutes. The preforms were molded for 2 to 10 minutes at a temperature and pressure of 160° C. and 250 kg/cm², then postcured by 5 hours of heat treatment at 200° C., yielding automotive brake pads in the respective examples.

The brake pads obtained in Examples 1 to 5 and in Comparative Examples 1 to 4 were tested or evaluated for porosity, fade, effectiveness, wear and environmental impact tests, and were assigned an overall rating under the following criteria.

(1) Porosity

Measured according to JIS D4418.

Good: 13 to 20%

Fair: 8 to 12%

(2) Fade

A performance test was carried out on a brake dynamometer in accordance with JASO C 406-87.

Good: Minimum friction coefficient ($\mu$)>0.30

Fair: Minimum friction coefficient ($\mu$)>0.20

(3) Effectiveness

A performance test was carried out on a brake dynamometer in accordance with JASO C 406-87. The result obtained in the third braking cycle was used to rate effectiveness. Percentages below are based on a value of 100% for the braking effectiveness in Comparative Example 1.

Good: >95%

Fair: >85%

(4) Wear

A performance test was carried out on a brake dynamometer in accordance with JASO C 406-87. Percentages below are based on a value of 100% for the amount of wear in Comparative Example 1.

Good: <105%

Fair: <110%

(5) Environmental Impact

This was evaluated based on the particle size specifications for the respective starting materials.

Good: Contains no inorganic fibers with a length of at least 5 $\mu$m, a diameter of up to 3 $\mu$m and an aspect ratio greater than 3 (which are inhalable and thus potentially carcinogenic)

Poor: Contains such inorganic fibers (6) Overall Rating

Good: None of the ratings obtained in tests (1) to (5) above were "Poor."

Poor: At least one of the ratings obtained in tests (1) to (5) was "Poor."

TABLE 1

| | | | Example | | | | | Comparative Example | | | |
|---|---|---|---|---|---|---|---|---|---|---|---|
| | | | 1 | 2 | 3 | 4 | 5 | 1 | 2 | 3 | 4 |
| | | Flow (125° C.) | | | | | | | | | |
| Composition (vol %) | Phenolic resin | 45 mm | | | | | | 20 | 20 | 15 | |
| | | 27 mm | 20 | | 20 | | | | | | |
| | | 10 mm | | 20 | | | | | | | |
| | | 2 mm | | | | 20 | 15 | | | | 12 |
| | Organic dust (1) | | 15 | 15 | 15 | 15 | 15 | 15 | 15 | 15 | 15 |
| | Aramid fibers (2) | | 3 | 3 | 3 | 3 | 3 | 3 | 3 | 3 | 3 |
| | Copper fibers (3) | | 4 | 4 | 4 | 4 | 4 | 4 | 4 | 4 | 4 |
| | Calcium hydroxide | | 3 | 3 | 3 | 3 | 3 | 3 | 3 | 3 | 3 |
| | Graphite (4) | | 8 | 8 | 8 | 8 | 8 | 8 | 8 | 8 | 8 |

TABLE 1-continued

|  |  | Example | | | | | Comparative Example | | | |
|---|---|---|---|---|---|---|---|---|---|---|
|  |  | 1 | 2 | 3 | 4 | 5 | 1 | 2 | 3 | 4 |
|  | Inorganic filler (5) | 27 | 27 | 27 | 27 | 32 | 27 | 27 | 32 | 35 |
|  | Potassium octatitanate whiskers (6) |  |  |  |  |  | 20 |  |  |  |
|  | Flake potassium octatitanate (7) | 20 | 20 |  | 20 | 20 |  | 20 | 20 | 20 |
|  | Tabular potassium hexatitanate (8) |  |  | 20 |  |  |  |  |  |  |
| Properties Test results | Porosity (%) | 11 | 13 | 11 | 16 | 20 | 17 | 5 | 7 | 26 |
|  | Fade | fair | good | fair | good | good | good | poor | poor | good |
|  | Effectiveness | fair | good | fair | good | good | good | poor | poor | good |
|  | Wear | good | good | good | good | good | good | good | good | poor |
|  | Environmental impact | good | good | good | good | good | poor | good | good | good |
|  | Overall rating | good | good | good | good | good | poor | poor | poor | poor |

Examples 6 to 13, Comparative Examples 5 to 7

Automotive brake pads were produced in the same way as in the above examples, but using friction material compositions formulated as shown in Table 2. The brake pads thus obtained were subjected to the same tests as above. The results are shown in Table 2.

As has been discussed above and is apparent from the foregoing results, the friction materials of the invention have a good braking performance and stability, are endowed with good resistance to fade and wear, provide improved safety and hygiene during production, and minimize the impact on the human body by dust released during use.

TABLE 2

|  |  |  | Example | | | | | | | | Comparative Example | | |
|---|---|---|---|---|---|---|---|---|---|---|---|---|---|
|  |  |  | 6 | 7 | 8 | 9 | 10 | 11 | 12 | 13 | 5 | 6 | 7 |
| Composition (vol %) | Phenolic resin | Flow (125° C.) |  |  |  |  |  |  |  |  |  |  |  |
|  |  | 45 mm |  |  |  |  |  |  |  |  | 20 | 15 |  |
|  |  | 27 mm | 20 |  |  |  | 20 |  |  |  |  |  |  |
|  |  | 10 mm |  | 20 |  |  |  | 20 |  |  |  |  |  |
|  |  | 2 mm |  |  | 20 | 15 |  |  | 20 | 15 |  |  | 12 |
|  | Organic dust (1) |  | 15 | 15 | 15 | 15 | 15 | 15 | 15 | 15 | 15 | 15 | 15 |
|  | Aramid fibers (2) |  | 3 | 3 | 3 | 3 | 3 | 3 | 3 | 3 | 3 | 3 | 3 |
|  | Copper fibers (3) |  | 4 | 4 | 4 | 4 | 4 | 4 | 4 | 4 | 4 | 4 | 4 |
|  | Calcium hydroxide |  | 3 | 3 | 3 | 3 | 3 | 3 | 3 | 3 | 33 | 3 |  |
|  | Graphite (4) |  | 8 | 8 | 8 | 8 | 8 | 8 | 8 | 8 | 8 | 8 | 8 |
|  | Inorganic filler (5) |  | 27 | 27 | 27 | 32 | 27 | 27 | 27 | 32 | 27 | 32 | 35 |
|  | Flake magnesium potassium octatitanate (9) |  | 20 | 20 | 20 | 20 |  |  |  |  | 20 | 20 | 20 |
|  | Surface-treated flake magnesium potassium octatitanate |  |  |  |  |  | 20 | 20 | 20 | 20 |  |  |  |
|  | Total |  | 100 | 100 | 100 | 100 | 100 | 100 | 100 | 100 | 100 | 100 | 100 |
| Properties Test results | Porosity (%) |  | 11 | 13 | 16 | 20 | 10 | 12 | 14 | 18 | 5 | 7 | 26 |
|  | Fade |  | fair | good | good | good | fair | good | good | good | poor | poor | good |
|  | Effectiveness |  | fair | good | good | good | fair | good | good | good | poor | poor | good |
|  | Wear |  | good | good | good | good | good | good | good | good | good | good | poor |
|  | Environmental impact |  | good | good | good | good | good | good | good | good | good | good | good |
|  | Overall rating |  | good | good | good | good | good | good | good | good | poor | poor | poor |

(1) Organic dust: cashew dust
(2) Aramid fibers: length, 1 to 3 mm; diameter, 12 to 15 μm
(3) Copper fibers: length, 3 mm; diameter, 60 μm
(4) Graphite: average particle size, 300 μm
(5) Inorganic filler: barium sulfate having an average particle size of 5 μm
(6) Potassium octatitanate whiskers: length, 1 to 3 μm; diameter, 0.3 to 0.6 μm
(7) Flake potassium octatitanate: average particle size, 3 μm
(8) Tabular potassium hexatitanate: size, 50 to 70 μm
(9) Flake magnesium potassium octatitanate: average particle size, 1 to 10 μm
(10) The surface-treated product was flake magnesium potassium octatitanate that had been surface-treated with aminopropyltriethoxysilane (silane content based on flake octatitanate, 0.5 wt %)

Japanese Patent Application Nos. 2001-200737 and 2001-282928 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A non-asbestos friction material made by molding and curing a composition comprising a fibrous base other than asbestos, a binder and a filler; wherein the fibrous base is free of inorganic fibers having a length of at least 5 $\mu$m, a diameter of up to 3 $\mu$m and an aspect ratio greater than 3, the binder includes a resin having a flow of at most 27 mm at 125° C., and the friction material has a porosity of 8 to 20%, wherein the filler comprises at least one of the following:

i) flake magnesium potassium octatitanate; and ii) a titanate which has been surface-treated with a silane coupling agent.

2. The non-asbestos friction material of claim 1 which contains as the filler 1 to 50 vol % of inorganic particles having a Mohs hardness of 4 to 5 and a particle size of 1 to 500 $\mu$m, based on the overall composition.

3. The non-asbestos friction material of claim 2, wherein the inorganic particles are a flake titanate or tabular titanate.

4. The non-asbestos friction material of claim 3, wherein the titanate is flake magnesium potassium octatitanate.

5. The non-asbestos friction material of claim 3, wherein the titanate has been surface-treated with a silane coupling agent.

* * * * *